S. H. DAVIES.
ANTISKID DEVICE FOR MOTOR VEHICLES.
APPLICATION FILED MAR. 30, 1921.
1,432,971.
Patented Oct. 24, 1922.
2 SHEETS—SHEET 1.
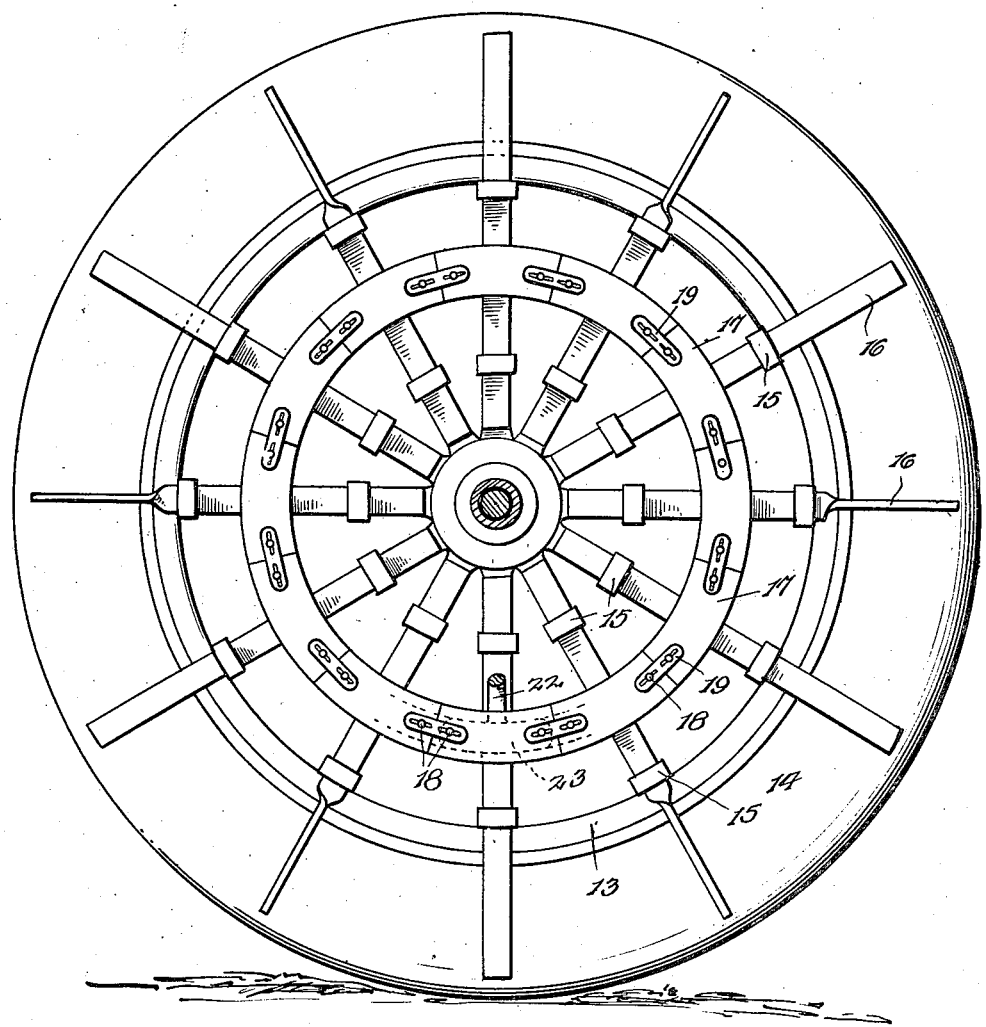
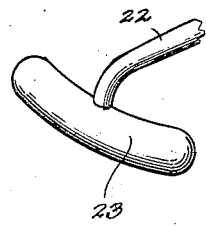
Inventor
S. H. Davies.
By Lacey & Lacey, Attorneys S. H. DAVIES.
ANTISKID DEVICE FOR MOTOR VEHICLES.
APPLICATION FILED MAR. 30, 1921.
1,432,971.
Patented Oct. 24, 1922.
2 SHEETS—SHEET 2.
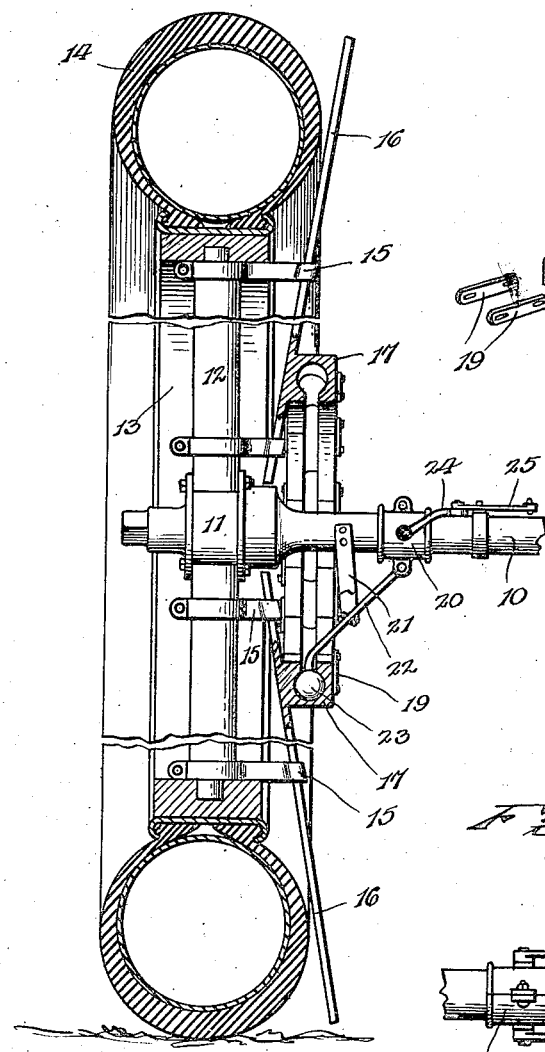
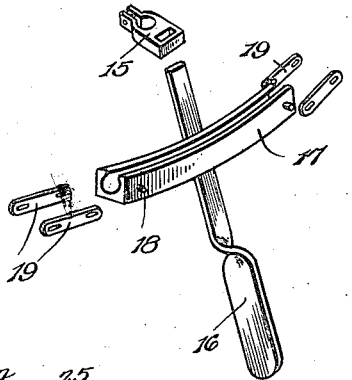
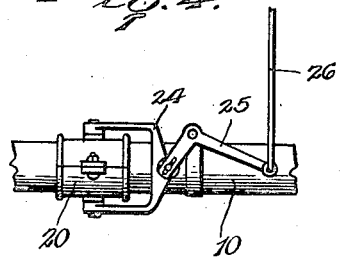
Inventor
S. H. Davies.
By Lacy & Lacy, Attorneys Patented Oct. 24, 1922.

1,432,971

UNITED STATES PATENT OFFICE.

SEPTIMUS H. DAVIES, OF CALGARY, ALBERTA, CANADA.

ANTISKID DEVICE FOR MOTOR VEHICLES.

Application filed March 30, 1921. Serial No. 457,017.

*To all whom it may concern:*

Be it known that I, SEPTIMUS H. DAVIES, a citizen of the United States, residing at Calgary, in the Province of Alberta and Dominion of Canada, have invented certain new and useful Improvements in Antiskid Devices for Motor Vehicles, of which the following is a specification.

This invention relates to an improved anti-slipping device for motor vehicles and has as one of its principal objects to provide a device of this character which may be employed in connection with the rear wheels of a vehicle and operated, as desired, to provide sure traction for the vehicle.

The invention has as a further object to provide a device employing a plurality of arms or dogs which may be projected to engage the ground at one side of the wheel carrying the device.

And the invention has as a still further object to provide a device which may be employed in connection with automobiles of substantially any conventional design.

Other and incidental objects will appear hereinafter.

In the drawings:

Figure 1 is a side elevation showing my improved device in connection with a wheel of a motor vehicle of conventional design, Figure 2 is a vertical sectional view more fully bringing out the mounting of the device, Figure 3 is a detail perspective showing one of the ground engaging arms or dogs employed, Figure 4 is a detail plan view particularly showing the control mechanism employed in connection with the device, and Figure 5 is a detail perspective view particularly showing the working end of the dog actuating lever employed.

Referring now more particularly to the drawings, I have shown my improved device in connection with the rear axle and one rear wheel of a motor vehicle of conventional design. The rear axle is indicated at 10 while the wheel hub is indicated at 11. Projecting from said hub are the wheel spokes 12 supporting a felly 13 and surrounding said felly is one of the vehicle tires as conventionally illustrated at 14. The present device is mounted at the inner side of the wheel or, in other words, that side of the wheel remote from the outer end of the wheel hub.

In carrying the invention into effect, I employ a plurality of guides 15, a pair of said guides being mounted in spaced relation upon each of the spokes 12. As shown in detail in Figure 2, the guides are provided at their inner end portions with spaced arms embracing the spokes and extending through the arms near their free ends are suitable bolts adjustable for clamping the arms about the spokes and firmly securing the guides thereto. Slidable through each pair of the guides is a radially disposed ground engaging arm or dog 16. Any approved number of these dogs may be employed and, as will be observed upon reference to Figure 1 of the drawings, the alternate dogs are twisted at their outer end portions so as to provide terminals lying at substantially right angles to the plane of the wheel while the intermediate dogs are straight and flat throughout their length. Formed on or otherwise secured to each of the dogs is a channel shaped segment 17 provided near each end thereof with a pair of laterally projecting pins 18 extending from opposite sides of the segment. The several segments of the dogs are, as also brought out in Figure 1, formed to mate and provide a channel shaped annulus lying at the inner sides of the dogs and loosely connecting said segments are links 19 provided at their end portions with slots freely receiving the pins 18 of the segments therethrough.

Slidable upon the adjacent end portion of the axle 10 is a collar 20 and suitably secured to the axle in advance of the collar is a substantially U-shaped depending guide bracket 21. Slidable freely through an opening in the bend of this bracket is a dog actuating lever 22 pivotally connected at its upper end with the collar and provided at its lower end, as particularly shown in Figure 4, with a cylindrical longitudinally curved head 23 which fits loosely in the channel of the annulus formed by the segments upon the dogs. As will be observed, the ends of said head are reduced or pointed so that the head may readily pass from one segment into another. Pivotally connected to the collar 20 is a yoke 24 straddling the collar and mounted in the rear of the collar is a bell crank 25, one arm of which is pivotally connected with said yoke while to the other arm of said bell crank is attached a rod 26 extending to the forward portion of the vehicle convenient to the driver's seat.

As will now be seen in view of the preceding description, the dogs 16 will, through the medium of the rod 26, be normally held retracted, the lever 22 sustaining the lowermost of said dogs. However, by pushing upon the rod 26, the lever 25 may be swung for shifting the collar 20 outwardly along the axle and swinging the lever 22 so that, as the rear wheels of the vehicle revolve, the head 23 of said lever will act to successively project the dogs into engagement with the ground. Accordingly, when slippery roads are encountered, the device may be brought into operation and will, as will be appreciated, provide sure traction for the vehicle, one of the improved devices being preferably employed in connection with each rear wheel of the vehicle.

Having thus described the invention, what is claimed as new is:

1. The combination with a vehicle wheel, of guides carried by the wheel spokes, dogs slidable radially through said guides to project at the periphery of the wheel, a segment carried by each of said dogs, the segments of the several dogs mating to provide an annulus, and means arranged to coact with said annulus for successively projecting the dogs.

2. The combination with a vehicle wheel, of guides secured to the wheel spokes, dogs slidable radially through said guides to project at the periphery of the wheel, a segment carried by each of said dogs, the segments of the several dogs mating to provide an annulus, means extending between the segments loosely connecting the dogs with each other, and means arranged to coact with said annulus for successively projecting the dogs.

3. The combination with a vehicle wheel, of guides carried by the wheel spokes, dogs slidable radially through said guides to project at the periphery of the wheel, a channel shaped segment carried by each of the dogs, the segments of the several dogs mating to provide a channeled annulus, and means slidable in said annulus and operable for successively projecting the dogs.

4. The combination with a vehicle wheel, of guides carried by the wheel spokes, dogs slidable radially through said guides to project at the periphery of the wheel, a channel shaped segment carried by each of the dogs, the segments of the several dogs mating to provide a channeled annulus, and a lever having a head slidably fitting in said annulus, the lever being operable for successively projecting the dogs.

5. The combination with a vehicle wheel, of guides carried by the wheel spokes, dogs slidable radially through said guides to project at the periphery of the wheel, a channel shaped segment carried by each of the dogs, the segments of the several dogs mating to provide a channeled annulus, a lever having a head slidably fitting in said annulus, the lever being operable for successively projecting the dogs, and means normally holding the lever retracted.

In testimony whereof I affix my signature.

SEPTIMUS H. DAVIES. [L. S.]